United States Patent [19]

Sharp

[11] 3,763,472

[45] Oct. 2, 1973

[54] DISTRIBUTING AND COLLECTING MEMORY ARRAY AND TRANSFER SYSTEM

[75] Inventor: Richard S. Sharp, Sierra Madre, Calif.

[73] Assignee: Burroughs Corporation, Detroit, Mich.

[22] Filed: Mar. 27, 1972

[21] Appl. No.: 238,189

[52] U.S. Cl. .......... 340/172.5

[51] Int. Cl. .......... G06f 5/04

[58] Field of Search .......... 340/172.5, 166 R, 340/168 R, 149 R

[56] References Cited

UNITED STATES PATENTS

| | | | |
|---|---|---|---|
| 3,496,544 | 2/1970 | Richmond et al. | 340/149 R |
| 3,581,286 | 5/1971 | Beausoleil | 340/172.5 |
| 3,611,309 | 10/1971 | Zingg | 340/172.5 |

*Primary Examiner*—Raulfe B. Zache
*Attorney*—Robert L. Parker et al.

[57] ABSTRACT

Apparatus for transferring bits of digital information between a plurality of a first bit-serial channel and a second bit-parallel channel. A matrix of bit storing cells is arranged with the cells in multiple rows and multiple columns, one row corresponding to each first channel. A first circuit establishes a serial bit transfer path between all cells in each row and the first channel corresponding to each such row. A second circuit establishes parallel bit transfer paths between the second channel and all cells in any row. Preferably, a second cell is provided in the rows and columns for each of the first mentioned cells. The second circuit establishes bit-parallel transfer paths into all the first mentioned cells of any row from the second channel and establishes bit-parallel transfer paths out of all the second cells of any row to the second channel. The first circuit establishes a bit-serial transfer path into the second cells in each row from each of the corresponding first channels and establishes a bit-serial transfer path out of the first mentioned cells in each row to each of the first channels corresponding to each row.

34 Claims, 2 Drawing Figures

DISTRIBUTING AND COLLECTING MEMORY ARRAY AND TRANSFER SYSTEM

BACKGROUND OF THE INVENTION

1. Field of the Invention

This invention relates to buffering systems digital data handling apparatus.

2. Description of the Prior Art

A data processing system includes a number of peripheral devices such as card readers, tape storage units, printers, and the like, and also commonly includes a number of terminals for data communication over transmission media such as telephone lines. These devices and terminals are controlled by one or more processing units, referred to as input-output (I-0) processors, which are predominantly occupied with transferring data between the peripheral devices and the internal operating store within the processing system. That is, the processing units take input data from the appropriate peripheral units and store them within the processing system, where subsequently the input data are processed; and additionally the processing units read processed data from the processing system and send them as output data to other appropriate peripheral units. The individual data transfer rates of the peripheral units and terminals are low as compared with the much greater data transfer capacity of an I-0 processing unit. Therefore, an I-0 processing unit typically serves and manages a large number of peripheral devices, the number being largely influenced by the individual data transfer rates of the devices in relationship to the total data transfer capacity of the processing unit. The processing unit or units generally operate on information presented in a parallel representation, and it is required that the peripheral devices present and receive data in a form that is amenable to the processing unit.

Thus, the processing units must communicate with the peripheral units so as to transfer digital data into and out of the system. To this end, prior art data processing systems have included various types of data handling subsystems. Generally such data handling systems include buffer registers for the peripheral devices and one or more switching arrays to provide a data transfer path between any selected one of the plurality of the peripheral devices and a buffer register serving the processing unit.

A problem of conventional switching arrays is their limited single level fan-in and fan-out capability. A single level fan ratio of 8:1 is practical and typical, which means that only eight different communication paths can be provided, one at a time, by a single switching array. Therefore, it has been common practice to cascade or place in series a number of switching arrays so as to increase the overall fan ratio to meet the needs of larger data processing system installations. The resulting multi-level switching arrays are complex and entail a large number of terminating connections and multi-lead interconnecting cables carrying information in the necessary parallel form. Also, the selection process for establishing a path through a series of arrays becomes involved and requires a correspondingly greater time for operation. Such complexity results in an expensive and cumbersome system.

SUMMARY OF THE INVENTION

Buffering apparatus according to the present invention transfer bits of digital information between a plurality of first bit-serial channels and at least one second bit-parallel channel. A matrix of bit storing cells is connected in multiple rows and multiple columns, one row corresponding to each of the first channels. First means establishes a path between all bit storing cells in each row and the first channel corresponding to each row. Second means establishes a parallel bit transfer path between the second channel and all cells in any row. Each of the first mentioned paths is adapted for transferring bits of information serially between the cells in each row and the bit-serial channel in the corresponding row.

Importantly, means is provided for selectively addressing each row of cells so as to enable the second means to establish a parallel bit transfer path between the second channel and all cells of the selected row.

Preferably, the cells are also arranged in groups in which each group contains one and only one cell from every row. Normally, a group will include cells from all the rows of the matrix, but it is not essential that all rows be represented. Group addressing means is provided so as to enable the first means to transfer bits between the first serial channels and the corresponding cells in the addressed group.

Buffering apparatus according to the present invention includes a matrix of bit storing cells connected in multiple rows and multiple columns. Conductor means is provided for each row and for each column of the cells. For each row, a gating means is provided for establishing a set of parallel bit transfer paths, each transfer path being a transfer path between one column conductor means and the corresponding cell in the row. Additionally for each row, a gating means is provided for establishing a set of bit transfer paths between the corresponding row conductor means and the cells in the corresponding row, the gating means being operated in a serial manner so as to establish a bit transfer path between the row conductor means and one and only one cell at a time.

With this arrangement, it will be seen that serial devices may be connected directly to the row conductors whereas the parallel processing unit may be connected directly to the column conductors. The serial-by-bit coupling has the advantage of minimizing the number of signal leads connected on the interface to the storage matrix. As a result, the amount of circuitry required for serial devices is minimized so that many serial input or output devices may be connected directly to the rows in the storage matrix without using an intermediate large tree-structured gating interface. The storage matrix provides internally a very large fan-in and fan-out capability to and from the parallel bit transfer channel. Such capability is inherent in conventional memory arrays, but it has not been utilized in prior art for coupling a large number of serial devices to a single parallel processing unit. Preferably, each row comprises a pair of registers. One register has bit storing cells for transferring bits of information from the bit-parallel channel to the corresponding bit-serial channel and the other register for transferring bits of information from the corresponding bit-serial channel to the bit-parallel channel.

Preferably, the invention as described above is in a system including a first unit for transferring bit signals in parallel and a plurality of second means each transferring bit signals serially.

DETAILED DESCRIPTION

Figure 1:
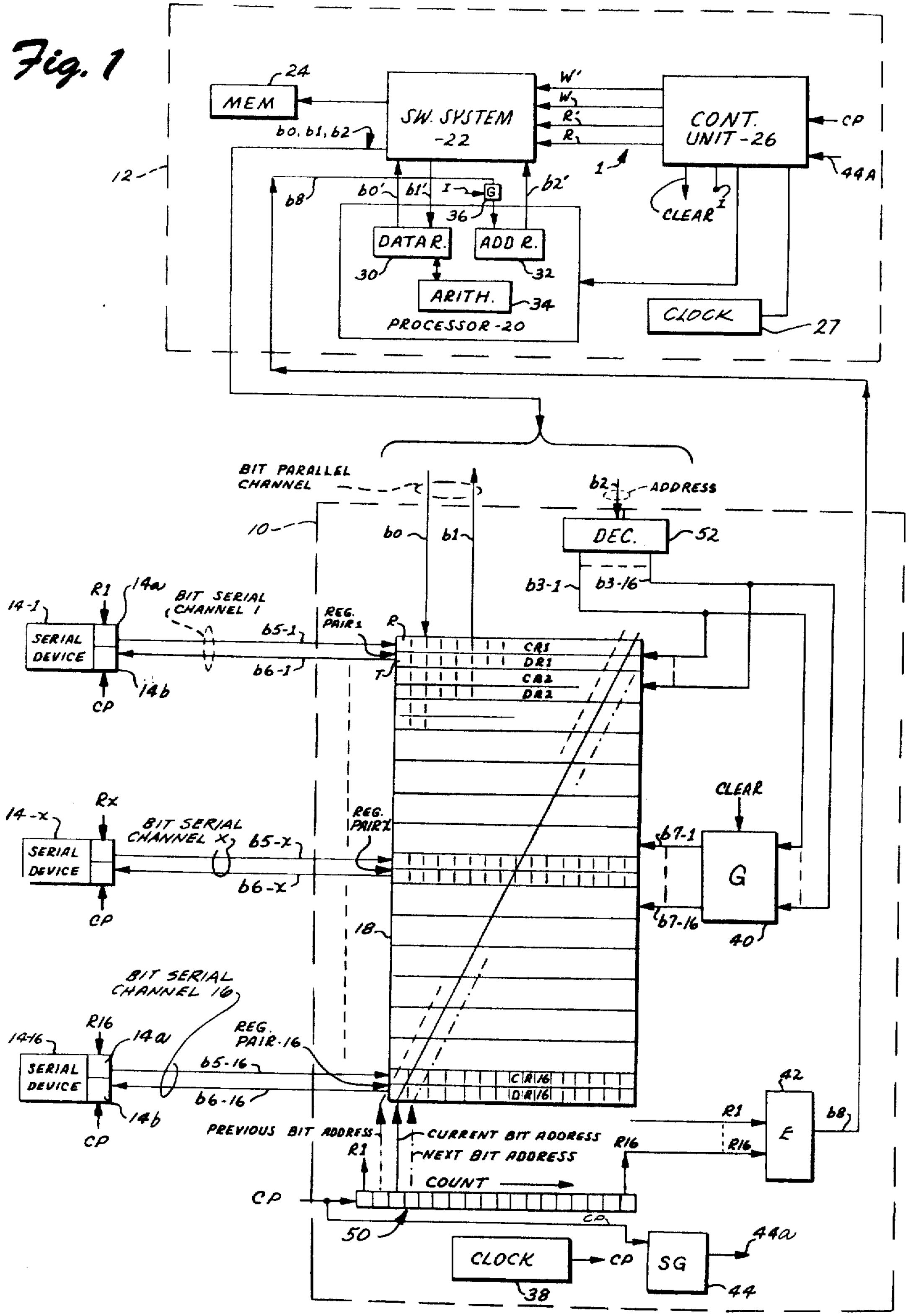
FIG. 1 is a block diagram of a data processing system and embodying the present invention.

Referring to FIG. 1, buffering apparatus comprising a distributing and collecting memory array 10 is disclosed for transferring bits of digital information between a plurality of bit-serial channels and a bit-parallel channel.

The bit-parallel channel consists of two buses *b*0 and *b*1. The bus *b*0 has 16 electrical leads (*b*0–1 through *b*0–16; see FIG. 2) for carrying 16 bits of information in parallel to the distributing and collecting memory array system 10 from the data processing system 12. The bus *b*1 has 16 electrical leads (*b*1–1 through *b*1–16; see FIG. 2) for carrying 16 bits of information in parallel from the distributing and collecting memory array system 10 to the data processing system 12.

There are 16 bit-serial channels designated 1 through 16. Each of channels 1 through 16 is connected to distributing and collecting array 10 by two electrical leads. The two leads of channel 1 through 16 are designated *b*5–1, *b*6–1; *b*5–2, *b*6–2; *b*5–3, *b*6–3; . . . *b*–16, *b*6–16, respectively. Each lead of the bit-serial channels carries a series of bits of information between the distributing and collecting memory array system 10 and one of 16 serial devices 14. The leads *b*5–1 to *b*5–16 carry a series of bits from the corresponding serial device 14 to the distributing and collecting memory system 10 whereas each of the leads *b*6–1 to *b*6–16 carry a series of bits of information from the distributing and collecting memory system 10 to the corresponding bit-serial device 14.

The distributing and collecting memory system 10 includes an array 18 of bit storing cells. The matrix 18 includes sixteen register pairs. In each register pair, one register is referred to as the collecting register (CR) and the other as the distributing register (DR). Each of the registers has 16 bistable storage cells, each storage cell in the collecting registers being referred to as an R cell (for a received bit) and each of the cells in the distributing register being referred to as a T cell (for a transmitted bit).

Data processing system 12 is preferably the B6500 or B6700 computer system manufactured by the Burroughs Corporation, or other similar device which sends and receives information over a channel in a parallel-by-bit manner, a word at a time.

One pair of registers CR and DR is provided for each of 16 serial devices 14–1 through 14–16. Register pairs CR–1, DR–1 and CR–2, DR–2, . . . and CR–16, DR–16, are provided for serial devices 14–1 and 14–2 . . . and 14–16, respectively.

In operation with data processing system 12, the distributing and collecting memory 10 behaves very much like a conventional word organized memory unit. The system 12 can address any register in the array 18 by sending appropriate address signals on bus *b*2. If the address selects a DR register in array 18, the data processing system 12 can store information in the register by sending a word on bus *b*0. If the address selects a CR register in array 18, the data processor receives a word of read-out information on bus *b*1.

The overall operation of array 18 is summarized as follows. When data processing system 12 has a word to send to a desired one of the serial devices 14, it sends an address over bus *b*2 to the distributing and collecting memory 10. The address so provided selects one of the distributing registers DR–1 through DR–16 corresponding to the desired one of the serial devices. When the selection is complete, the output word from data processing system 12 is sent over bus *b*0, bit parallel, to distributing and collecting array 10 and is stored in the addressed one of DR–1 through DR–16. Then, in a second phase of the operation, the bits of the word in the DR register are read out one by one, non-destructively, and are transmitted serially over the corresponding one of the leads *b*6–1 through *b*6–16. This action accomplishes a serial-by-bit transfer of the word from the DR register to the corresponding serial device 14. Simultaneously with this transfer, the serial device transmits a word, one bit at a time, over the corresponding one of the leads *b*5–1 through *b*5–16 in the same channel. The bits of the input word received serially are stored in successive cells in the CR register that is paired with the DR register. Thus, simultaneously with the reading out and transmission of the bits of a DR word to a serial device over lead *b*6 in one channel, the same serial device is sending the bits of an input word over lead *b*5 in the same channel for storage and accumulation in the CR of the register pair. For each bit read out and transmitted from a DR cell, a bit is received and stored in a corresponding CR cell. Then, in a final phase of operation, the data processing system is called upon to read the word that has been received from the serial device and stored in the corresponding CR register. To this end, the data processing system 12 sends an appropriate address over the bus *b*2 to select the desired one of the collecting registers CR– 1 through CR–16. When the selection is completed, the word is read from the selected one of CR–1 through CR–16 and is sent from array 18 over the bus *b*1, bit parallel, to the system 12.

The summary of operation as described in the preceding paragraph may imply that the operation of the data processing system 12 is locked to the operation of the distributing and collecting memory 10. In actuality, such synchronism is not an essential characteristic of the invention and is not a requirement. A word may be transmitted from a DR register to a serial device repeatedly until the serial device gives notification of acceptance of the word by transmitting an acknowledging word. Furthermore, the full duplex mode of operation with the serial device may in fact be effectively a half duplex mode in which either the transmitted word or the received word may be a null word.

It should be noted that the bit storage cells R and T are arranged into rows and columns, one row of R cells and one row of T cells for each of the serial devices 14. Gating and control (FIG. 2) is provided for establishing a parallel bit transfer path from the bit-parallel channel *b*0 to all of the cells in any selected one of the rows DR–1 through DR–16, and for establishing a parallel bit transfer path from all of the cells in any selected one of the rows CR–1 through CR–16 to bit-parallel channel *b*1.

Also, gating and other control (FIG. 2) is provided for establishing bit-serial transfer paths between any cell in each row and the serial device corresponding to such row. That is, bit transfer paths can be established between the lead *b*5 of any bit-serial channel and any cell in the corresponding CR row, and between any cell in a DR row and the lead *b*6 of the corresponding bit-serial channel. Preferably, bits are transferred between each of the serial devices and the cells in the corresponding CR and DR registers in both directions simultaneously and in all rows simultaneously. Thus, one bit may be read from a DR cell and one bit may be stored in a CR cell in all register pairs simultaneously.

In the matrix of cells in the array 18, bits are stored in each of the CR and DR registers with the bits of the same order of significance in a word, i.e., most significant to least significant, aligned in vertical columns. However, in transferring bits to and from the serial devices, the cells are selected in successive groups that fall in a diagonal pattern across the array 18, as indicated by the diagonal line in FIG. 1. With the diagonal selection pattern, read out and storage of the bits as they are transferred to and from the serial devices takes place in cells of difference orders of significance in each of the register pairs. This is advantageous because the data processing system 12 reads a word from one of the CR or stores a word into one of the DR when the bit-serial transfer cycle with the corresponding serial device has been completed. The diagonal read out and storage of bits allows the transfer of information between the successive register pairs of the array 18 and the data processing system 12 to be staggered in time with respect to one another rather than requiring the data processing system 12 to service all of the register pairs at the same time.

A ring counter 50 continuously counts pulses from a source 38 of regularly occurring clock pulses. The ring counter has sixteen states, one for each column of cells in matrix 18. Each state of ring counter 50 selects a different diagonal of cells, each diagonal group containing one cell from each register for serial reading and storage as disclosed above.

Consider now the details of the data processing system 12 shown in FIG. 1. A processor 20 is connected through a switching system 22 to one or more memories 24 (only one memory 24 being shown for simplicity). A control unit 26 may be a conventional sequence counter which controls the sequence of operation of the computer system. The switching system 22, under control of the control unit 26, connects the processor 20 to any one of the plurality of memories 24. The distributing and collecting memory 10 is connected in essentially the same way as one of the memories 24.

The processor 20 includes an arithmetic unit 34, an input-output interface data register 30 and an address register 32. The address register 32 is used to store an address, part of which identifies the desired one of the memories 24 and the remaining part of which identifies a location within the desired memory 24 at which information is to be read or written. The same parts of the address may respectively identify the distributing and collecting memory 10 and a particular register therein. The data register 30 is a register which stores the information to be written into the memory 24 and which receives information read-out from the memory 24. Buses *b*0' and *b*1' each illustrate a plurality of electrical leads which connect the data register 30 to the switching system 22. Bus *b*2' represents a plurality of electrical leads which connect the address register 34 to the switching system 22. The switching system 22 is similar to a conventional crossbar switcihing system which is capable of routing any one of the buses *b*0', *b*1' and *b*2' from processor 20 to either memory 24 or to buses *b*0, *b*1 and *b*2 shown going from the switching system 22 to the distributing and collecting memory array 10.

Explained in more detail hereinafter, a control signal is formed on line 44a by the memory array 10 whenever serial communication with one of the serial devices has resulted in a complete word stored into and/or a word compltely read out of one of the register pairs. Simultaneously with the signal on 44*a*, an address which identifies one of the register pairs is applied on bus *b*8. The control unit 26 is responsive to the control signal on line 44*a* to selectively form a control signal at the I output which causes gate 36 to gate the address on bus *b*8 into the address register 32. The control unit 26 subsequently forms a control signal at the R output, causing the switching system 22 to gate the address contained in register 32 from bus *b*2' to bus *b*2, where it is used to address the array 18 and thereby select the corresponding register pair. Subsequently, the word stored in the CR of the addressed register pair is applied on bus *b*1. The control unit 26 forms a signal at R' which causes the switching system 22 to couple the word on bus *b*1 to bus *b*1' where it is applied and stored in the data register 30. As an alternative, the address itself can be used to create the R and R' signals.

The data processing system 12 then handles the word stored in data register 30, which normally involves the task of storing the word into one of memories 24, where the word is placed properly within the block of information corresponding to the serial device. After a possible interval of operation under program control, the data processor 20 restores the address of the same register pair to address register 32 and a new output data word for the same serial device is stored in the data register 30. The control unit 26 then forms a control signal at the W output and simultaneously a control signal at the CLEAR output. The control signal at the W output causes the address in address register 32 appearing on bus *b*2' to be coupled to bus *b*2 where it is applied to memory array 10 to select the corresponding register pair. The CLEAR signal causes the gate 40 to clear the contents of the addressed register pair to 0. The control unit 26 then applies a control signal at the W' output which causes the switching system 22 to couple the bus *b*2' and *b*0' to the buses *b*2 and *b*0, respectively, thereby applying the address in register 32 and the word in register 30 to the distributing and collecting memory system 10. This then will cause the system 10 to store the word on bus *b*0 into the DR of the same register pair from which a word was previously read.

Refer now to the serial devices 14. Each of the serial devices 14 is provided with two shift registers identified as 14*a* and 14*b*. The shift register 14*a* may be a conventional flip-flop shift register which shifts the bits of information contained therein out on the corresponding lead *b*5. Shift register 14*b* may also be a conventional shift register which is provided for serially shifting in the bits of information transmitted on the corresponding lead *b*6. The shifting out of bits of information from shift register 14*a* and the shifting in of bits of information to shift register 14*b* is synchronized with clock pulses CP from a source of clock signals 38 provided in the distributing and collecting memory system 10. Thus, each time a clock pulse appears at CP, a bit of information is shifted out of a shift register 14*a* onto a corresponding one of the leads *b*5 and a bit of information is shifted into shift register 14*b* from the corresponding one of the leads *b*6.

The ring counter 50 has outputs referenced by the symbols R1 through R16 (only R1 and R16 being shown for purposes of explanation). Signals at each output of the ring counter 50 are applied to the correspondingly numbered serial device 14–1 through 14–16 for the purpose of signalling the corresponding serial device to load a new word into shift register 14*a* and to use the word just stored into register 14*b*. Such use may involve storing the word in a magnetic as in the case of a tape transport or other memory device or printing the word as in the case of a printer.

Consider now the details of the distributing and collecting memory array 10 with reference to FIG. 1. The ring counter 50 is a conventional ring counter which counts from one state to the next in response to clock pulses from the source of clock pulses 38. Each of the 16 outputs of the ring counter 50 is connected to one of the diagonal leads across the array 18 as described hereinabove. The ring counter 50 has 16 states, one for each of the serial devices 14. When the ring counter 50 reaches state 16, its last state, it recycles to state 1 and repeats its sequence of states.

The distributing and collecting memory array 10 also includes a decoder 52. The decoder 52 receives an address on bus *b*2 and decodes it into a signal on one of the 16 leads *b*3–1 to *b*3–16 (only leads *b*3–1 and *b*3–16 being shown for simplicity). One of leads *b*3–1 through *b*3–16 is connected to each of the register pairs. Thus, *b*3–1 is connected to CR–1 and DR–1, and *b*3–16 is connected to CR–16 and DR–16. In this manner, an address on bus *b*2 can select one and only one of the 16 register pairs for reading or writing.

A set of gates 40 is also connected to the leads *b*3–1 through *b*3–16. Each gate therein has a control input connected to the CLEAR output of the control unit 26. A control signal on the CLEAR lead causes the set of gates 40 to route the CLEAR signal to one and only one of sixteen leads *b*7–1 through *b*7–16 (only leads *b*7–1 and *b*7–16 being shown for simplicity). The leads *b*7–1 through *b*7–16 are connected to separate ones of the 16 register pairs. Thus, leads *b*7–1 through *b*7–16 are connected to register pairs 1 through 16, respectively. A control signal on one of the leads causes the corresponding register pair to be cleared to 0.

An encoder 42 is connected to the outputs R1 through R16 of the ring counter 50. Encoder 42 is responsive to the signals at R1 through R16 from ring counter 50 for forming signals on the output bus *b*8 that represent a binary coded address for register pairs 1 through 16, respectively. Thus, states 1 through 16 of the ring counter 50 cause the binary address of register pairs 1 through 16, respectively, to be formed.

A signal generator 44 is actuated by the signal which controls ring counter 50. Each time the ring counter 50 receives a control signal, the signal generator 44 is responsive to the new signal to form a pulse at its output 44*a* which in turn is applied to the control unit 26 as described hereinabove.

Figure 2:
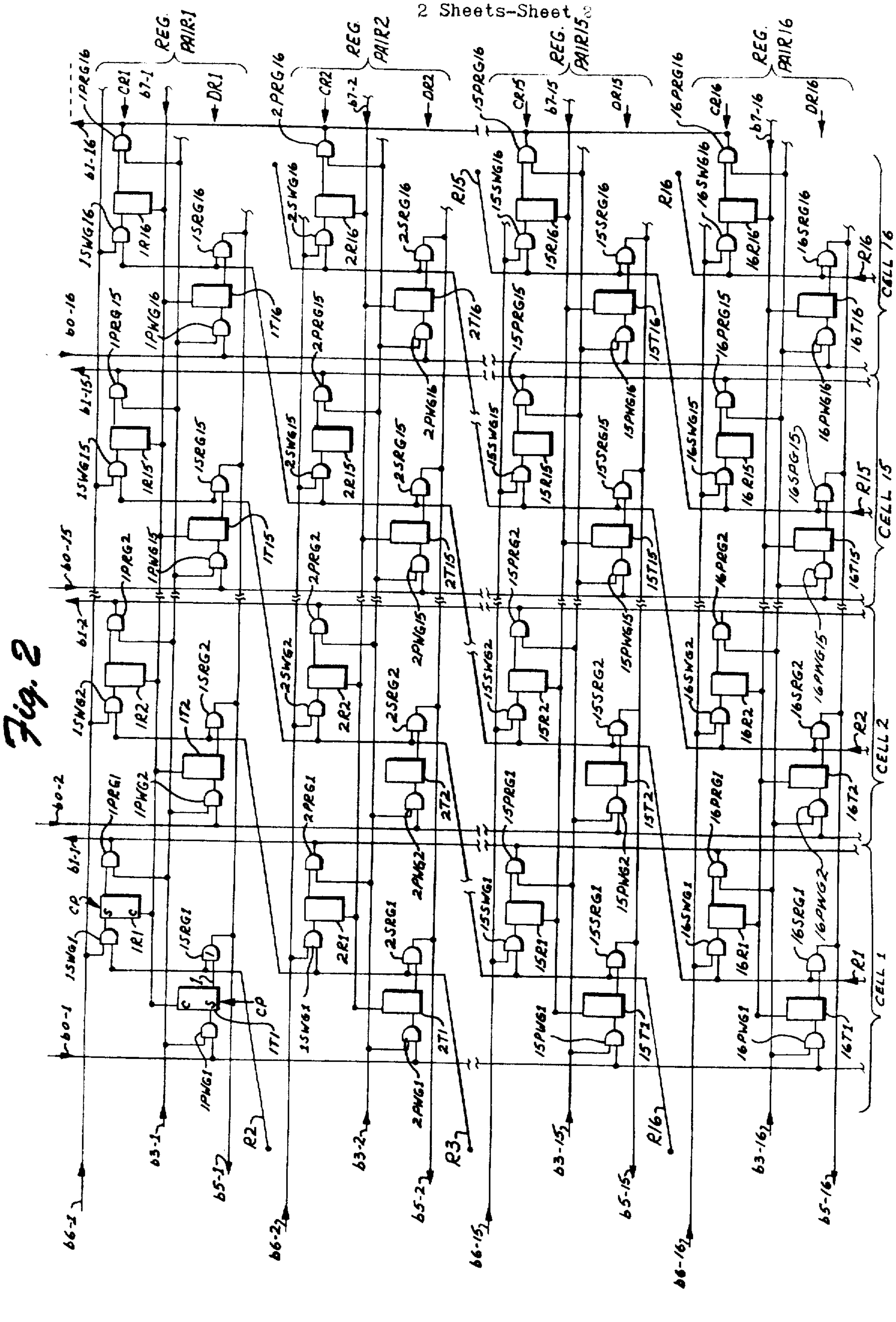
FIG. 2 is a schematic and block diagram showing the details of the collecting and distributing array of a data processing system of FIG. 1.

Refer now to the array 18 which is shown in detail in FIG. 2. For simplicity, only four of the sixteen register pairs are shown in FIG. 2, the four register pairs being labeled along the right-hand side of FIG. 2. Also for simplicity, only four of the sixteen storage cells of the registers are shown and are indicated along the bottom of FIG. 2. The cell numbers along the bottom of FIG. 2 also identify a vertical column in which the storage cells of each register lie in the overall array and the register pair numbers along the right-hand side identify the rows in which the storage cells of each register are located in the overall array. For ease of explanation, each of the collecting register and distributing register storage cells is identified by a letter and two numbers, oe number preceding and one number following the letter. The number preceding the letter identifies the row and the number following the letter identifies the column in which the corresponding storage cell is located. Thus, referring to the storage cells: in row 1, column 1, the bit cells of CR–1 and DR–1 are 1R1 and 1T1; in row 1, column 2, the bit cells of CR–1 and DR–1 are 1R2 and 1T2; in row 16, column 1, the bit cells of CR–16 and DR–16 are identified as 16R1 and 16T1, respectively; and in row 16, column 16, the bit cells of CR–16 and DR–16 are identified as 16R16 and 16T16.

The bit-serial input leads *b*6–1 through *b*6–16 are associated with register pairs 1 through 16, respectively. Similarly, the bit-serial output leads *b*5–1 through *b*5–16 are associated with register pairs 1 through 16, respectively. The bit-parallel input leads *b*0–1 through *b*0–16 of bus *b*0 are associated with the storage cells of columns 1 through 16, respectively. Similarly, the bit-parallel output leads *b*1–1 through *b*1–16 are associated with the storage cells of columns 1 through 16, respectively. The output leads from the ring counter 50 extend diagonally across the array of FIG. 2 so that in each register pair the two cells in the same row and column are associated with and connected to the same output of the ring counter, but each output from the ring counter 50 is connected to pairs of storage cells occupying different columns in each of the register pairs.

Consider now the interconnection between the storage cells and the above-described leads. Serial write gates (SWG) are used for storing information, bit serial, from leads *b*6–1 through *b*6–16, into each of the storage cells, one by one, of CR–1 through CR–16. Similarly, serial read gates (SRG) are provided for reading out information, bit serial, onto one of the bit serial leads *b*5–1 through *b*5–16 from each of the storage cells, one by one, of DR–1 through DR–16. Parallel write gates (PWG) are provided for storing information, bit parallel, from the leads of bus *b*0 into all of the storage cells of any one of DR–1 through DR–16. Also, parallel read gates (PRG) are provided for reading out information, bit parallel, from each of the storage cells of any of CR–1 through CR–16 onto bus *b*1. One serial write gate and one parallel read gate are provided for each CR cell and one parallel write gate and one serial read gate are provided for each DR cell and abbreviated as SWG, PRG, PWG, and SRG, respectively. A number precedes each of these symbols to designate the row of the corresponding cell and a number follows the abbreviation to designate the column of the corresponding cell. Thus 1SWG1, 1PRG1, 1PWG1 and 1SRG1 are associated with the cells of row 1, column 1.

Consider now the details of the aforementioned gates. Each of the aforementioned gates is an AND gate having two inputs. Referring to the SRG gates, each has one input connected to the "1" output of the corresponding T storage cells in the distributing registers DR and a second input connected to one output of the ring counter 50. Thus, 1SRG1 is connected to the "1" output of 1T1 and output R2, 16SRG16 is connected to the "1" output of 16T16 and the R16 output of the ring counter. The output of each of the SRGs is connected to the associated bit serial lead of *b*5–1 through *b*5–16. Thus, 1SRG1 through 1SRG16 have outputs connected to *b*5–1 and 16SRG1 through 16SRG16 have outputs connected to *b*5–16.

Refer now to the SWG gates. For each row of R cells comprising a CR register, SWGs have an input connected to the corresponding lead of bus *b*6, a second input connected to the same lead of the ring counter as the corresponding SRG and an output connected to the S input of the correspondingly numbered R cell. When the output of the serial write gate is true, the corresponding R cell is set to a "1" state. Thus, 1SWG1 has one input connected to *b*6–1 and a second input connected to output R2, and an output connected to the set (s) input of 1R1.

Consider now the PWGs. Each PWG has one input connected to the corresponding lead of bit-parallel bus *b*0, a second input connected to the corresponding one of address leads *b*3–1 through *b*3–16, and an output connected to the set (s) input of the corresponding cell. Thus, 1PWG1 has an input connected to *b*0–1, a second input connected to address lead *b*3–1, and an output connected to 1R1.

Consider now the PRG gates. Each PRG has one input connected to the "1" output of the corresponding R cell and a second input connected to the same address lead of *b*3–1 through *b*3–16 as the corresponding PWG. Thus, 1PRG1 has an input connected to the "1" output of cell 1R1 and a second input connected to the address lead *b*3–1. The output of each PRG is connected to its corresponding lead of bit-parallel bus *b*1. Thus, the outputs of 1PRG1 through 16PRG1 are all connected to lead *b*1–1.

It should be noted that each of the bit storage cells R and T are, by way of example, a conventional, semiconductor bistable flip-flop circuit well known in the digital computer art. Each of the circuits is characterized in that a control signal applied at the S input sets the circuit to "1" state, whereas a control signal at the C input clears it or sets it to a "0" state. Once set to "1" state, the circuit holds the state until it receives a control signal at the appropriate input setting it to a different state. Each of the flip-flop circuits is also characterized in that it has a control input (not shown) connected to the CP output of the source of clock pulses 38. Each of the storage cells is characterized in that it is set to a "1" state responsive to a control signal at the S input only in response to a control signal at the CP output. However, a control signal at the C input will clear or reset the cell to a "0" state without the occurrence of a clock pulse.

The CLEAR leads *b*7–1 through *b*7–16 are associated with the register pairs 1 through 16, respectively. The C input of the storage cells in each row is connected to the corresponding CLEAR lead. Thus, the C input of storage cells 1R1 through 1R16 and 1T1 through 1T16 is connected to CLEAR lead *b*7–1 and the C inputs of 16R1 through 16R16 and 16T1 through 16T16 are connected to the CLEAR lead *b*7–16. Although the circuitry of FIG. 2 may be formed in discrete circuits of the aforementioned type, they are preferably made in the form of an integrated circuit in which case many of the terminals described hereinabove may not be specifically identified. However, the functions as described above will be present.

It will now be seen that the matrix of FIG. 2 consists of bit storage cells arranged in multiple rows and multiple columns, one row of R cells for each of bit-serial input leads *b*6–1 through *b*6–16 and one row of T cells for each of bit-serial output leads *b*5–1 through *b*5–16. All of the PWGs in one row form a means for establishing a parallel bit transfer path between the bit-parallel channel of bus *b*0 and the inputs of the storage cells of the DR in each row. Similarly, all of the PRGs in a row form a means for establishing a parallel bit transfer path from the output of each of the storage cells of the CR in each row to the bit-parallel bus *b*1. In this manner, all of the PWGs of any one row and all of the PRGs of any one row establish a parallel bit transfer path between the bus *b*0 and bus *b*1, respectively, and all of the cells in the DR and CR of the corresponding row.

It will also be seen that each of the SWGs in the CR of one row of the array form a means for establishing a bit-serial transfer path between the input of the cells in the corresponding row and the corresponding bit-serial lead *b*6–1 through *b*6–16. Similarly, all of the SRGs in the DR of one row of the array form means for establishing a bit-serial transfer path between the outputs of the cells in the DR of the corresponding row and the corresponding bit-serial lead *b*5–1 through *b*5–16. In this manner, the SWGs and SRGs establish, bit serial, transfer paths between the bit-serial channels and the cells R and T.

Consider now the overall operation of the data processing system shown in FIG. 1, including the array shown in FIG. 2. The ring counter 50 operates continuously, counting from one state to the next and, upon reaching its last state, recycling and continuing the counting. Each step of the ring counter is made responsive to a clock pulse from clock source 38. Each output of the ring counter addresses the last storage cell pair, i.e., the pair in column 16, of a different register pair corresponding to the state of the ring counter. Such addressing of a last storage cell pair signifies that the CR register in the register pair may have accumulated a complete word composed of bits of information received serially from the corresponding serial device and also that all the bits of a word have been read out of the corresponding DR and have been transmitted serially to the same serial device. The signal generator 44 detects the time when the ring counter 50 is stepped to a new state and at that time provides a control signal at the 44*a* output. The control signal at the 44*a* output causes the control unit 26 to form a control signal at the I output which, in turn, causes the gate 36 to store the address of the CR and DR register pair, formed at the output of encoder 42, into address register 32. The control unit 26 then forms a control signal at the R output which causes switching system 22 to couple the address word contained in the address register 32 back onto bus *b*2 to the decoder 52. The decoder 52 decodes the address and applies a control signal on the corresponding one of leads *b*3–1 through *b*3–16, addressing the same register pair identified by the address originally obtained from encoder 42. The control signal on one of leads *b*3–1 through *b*3–16 activates one input of each of the PRGs in the CR of the corresponding register pair. Each of the R cells therein which is storing a 1 applies a data signal to the other input of each of the PRGs. As a result, each of the PRGs whose R cell contains a 1 applies a data signal representing a 1 on the corresponding one of *b*1–1 through *b*1–16, which in turn is coupled back via bus *b*1 to the switching system 22. The control unit 26 then forms a control signal at the R' output, causing the word on bus *b*1 to be coupled back through the switching system 22 and stored into the data register 30. The data processing system 12 then independently goes about the task of processing the word contained in the data register 30, such as by storing the word into an appropriate block record in memory 24. After processing the word, or perhaps on another basis, the data processing system obtains a new word to be sent back out to the same serial device from which a word was just received. Actually, this might be done on a next cycle. The word is stored into the data register 30 as a result of using conventional data processing techniques which form no part of the present invention and need not be explained herein. Also, the address of the same CR and DR register pair had been retained and is now restored back into the address register 32.

Subsequently, the control unit 26 forms a control signal at the W output causing the switching system 22 to couple the address in register 32 via bus *b*2 back to the distributing and collecting memory system 10. The decoder 52 decodes the address from address register 32 and forms a control signal on the corresponding one of address leads *b*3–1 through *b*3–16. The control unit 26 simultaneously with the signal at W forms a control signal at the CLEAR output. This causes one of the set of gates 40 to apply a control signal on the corresponding one of leads *b*7–1 through *b*7–16. The control signal on one of leads *b*7–1 to *b*7–16 causes the cells in the corresponding CR and DR register pairs to be cleared or reset to 0, immediately, without waiting for a clock pulse. A control signal is then formed at W', causing the address in register 32 and the word in register 30 to be coupled via buses *b*2 and *b*0 to the system 10. The decoder 52 again forms a control signal on the same one of address leads *b*3–1 through *b*3–16 from which a word was previously read. The operation of the data processing system 12 is controlled by a clock 27 at a much faster clock rate than that of memory array 10 and all of the signals R, R', W, W' and CLEAR occur in between clock pulses from 38. Subsequently, the clock pulse generator 38 forms the next clock pulse and the one of leads *b*3–1 through *b*3–16 which is receiving a control signal causes the PWG for each cell in the corresponding register pair to store a "1" bit into the T cells for each of leads *b*0–1 to *b*0–16 which carries a "1" bit. Then the ring counter 50 continues to count, addressing the storage cells of the CR and DR register pairs in sequence.

Assuming for purposes of explanation that row 16 was the one into which a word was just stored by the data processing system 12, ring counter 50 goes from state 16 to state 1, forming a control signal at the R1 output. The control signal at the R1 output is applied to one input of gates 16SRG1 and 16SWG1. Thus, if a "1" bit signal is presently being formed on the bit-serial lead *b*6–16, gate 16SWG1 sets 16R1 to a 1 state. If a "0" bit signal is being formed on lead *b*6–16, then storage cell 1R1 remains in a 0 state. Considering the gate 16SRG1, assume that storage cell 16T1 is storing a "1". The control signal on lead R1 causes the gate 16SRG1 to form a signal representing a "1" bit on bit-serial lead *b*5–16. Similarly, if the storage cell 16T1 is storing a 0, then a signal representing a "0" bit is applied on bit-serial lead *b*5–16.

It should be noted that simultaneously with the serial storage of a bit into 16R1 and the serial reading out of a bit from 16T1, that the SWGs for storage cells 15R2 . . . 2R15, 1R16 are simultaneously writing information from lead *b*6–15 . . . *b*6–2, *b*6–1 and that the SRGs for storage cells 15T2 . . . 2T15, 1T16 are reading out the content of storage cells onto bit-serial leads *b*5–15 . . . *b*5–2, *b*5–1. The aforementioned transfer of information continues repeatedly with each clock pulse. As a result, the overall information transfer rate into and out of the array is much greater than the transfer rate with any one particular serial device because all serial devices are served simultaneously.

It will be seen that redundant exchanges of information may occur. For example, one of the serial devices may not have transferred information into a register when the ring counter 50 has counted to a state corresponding to the last cell in the corresponding register pair. With such an arrangement, the data processor would read the CR even though it does not contain new information. Hence, the word transferred to the data register 30 would be all 0's. To alleviate the need for redundant transfers to the data processing system 12, if necessary, various technqiues may be applied. For example, the last bit storage cell in each of the CRs may be reserved for the storage of a bit which is a "1" only when the corresponding serial device has transferred a complete word of information into the CR register. In an alternate embodiment of the invention, the presence of a 1 bit in the most significant position may be required to condition signal processor 44 and so initiate the data processing system 12 to order the transfer from the distributing and collecting memory array 10.

It should also be noted that there may be times when the data processing system will not have a word to send back to the DR of the register pair from which a word was just transmitted to the serial device. In this case, the data processor would send a "null word" which may consist of all 0's and would leave the corresponding DR with all 0's. The serial device could be arranged to recognize and ignore, or otherwise appropriately handle, a "null word" accumulated in the corresponding shift register 14*b*.

It will also be apparent to those skilled in the art that rather than having the collecting registers (CR) and distributing registers (DR) all in the same memory array, they may be separated into a common distributing array and a separate common collecting array. Although it is a significant improvement to use two registers, the use of two registers for each row is not essential to the broader embodiments of the invention. The elimination of one register may be achieved by using a two-phase operation in which a word is transmitted from a register in the distributing and collecting array to one of the serial devices in a first transmit phase and a word is received from a serial device and collected in the same register of the distributing and collecting array in a second receive phase. Additionally, the array of bit storing cells need not have the same number of cells in a row as there are rows but may be of any configuration and of any size. Further, it is contemplated that several rows may have completed collecting information from corresponding serial devices at the same time in which case the data processing system would be arranged for appropriately reading them out. It is further contemplated that the counter may be provided with one or more states in addition to those required for addressing all columns in the array. The extra state or states would be used to allow processing time by the data processing system 12. These and other variations of the embodiment disclosed herein are possible without departing from the spirit and scope of the invention as defined in the appended claims.

What is claimed is:

1. Buffering apparatus for transferring signal bits of digital information to a plurality of first bit-serial channels from at least one second bit-parallel channel, the apparatus comprising:

a memory comprising a matrix of bit storing cells connected in multiple rows and multiple columns, one row corresponding to each first channel;

a separate input conductor for each said column, the input conductors together receiving signal bits from the bit-parallel channel;

a separate output conductor for each row, each for coupling signal bits to one of said bit-serial channels;

first gating means establishing a parallel bit transfer path from all input conductors to the corresponding column cells in any one row; and second gating means establishing a path for transferring bits of information from all cells in any row to the corresponding output conductor including serial gating means for establishing such path serial by cell within each row.

2. Apparatus according to claim 1 wherein the second gating means comprises means for simultaneously transferring a bit from a cell in each row in parallel.

3. Apparatus according to claim 1 wherein said cells are in groups, a cell from each row in each group, and comprising group transfer means for simultaneously enabling the serial gating means to simultaneously transfer a bit from a cell in each group to one of the output conductors.

4. Apparatus according to claim 3 comprising means for enabling said group transfer means to transfer bits serially by groups.

5. Apparatus according to claim 4 wherein said enabling means comprises a counter for repeatedly counting through a sequence of counts, one count for each of said groups.

6. Buffering apparatus for transferring signal bits of digital information between a plurality of first bit-serial channels and at least one second bit-parallel channel, the apparatus comprising:

a matrix of pairs of bit storing cells connected in multiple rows and multiple columns, one row corresponding to each first channel, each of said pairs of cells comprising first and second cells;

first means establishing a parallel bit transfer path between the second channel and all cells in any one row, said first means comprising means for establishing transfer paths into the first cells from the second channel and means for establishing transfer paths out of the second cells to the second channel; and second means establishing a path adapted for transferring bits of information serially between all cells in a row and the corresponding first channel.

7. Buffering apparatus for transferring signal bits of digital information between a plurality of first bit-serial channels and at least one second bit-parallel channel, the apparatus comprising:

a matrix of pairs of bit storing cells connected in multiple rows and multiple columns, one row corresponding to each first channel, each of said pairs of cells comprising first and second cells;

first means establishing a parallel bit transfer path between the second channel and all cells in any one row; and second means establishing a path adapted for transferring bits of information serially between all cells in a row and the corresponding first channel, said second means establishing transfer paths into the second cells from the corresponding first channels and establishing transfer paths out of the first cells to the second channels.

8. Buffering apparatus for transferring signal bits of digital information between a plurality of first bit-serial channels and at least one second bit-parallel channel, the apparatus comprising:

a matrix of pairs of bit storing cells connected in multiple rows and multiple columns, one row corresponding to each first channel, each of said pairs of cells comprising first and second cells;

first means establishing a parallel bit transfer path between the second channel and all cells in any one row, said first means comprising means establishing transfer paths into the first cells from the second channel and means establishing transfer paths out of the second cells to the second channel; and second means establishing a path adapted for transferring bits of information serially between all cells in a row and the corresponding first channel, said second means comprising means establishing transfer paths into the second cells from the corresponding first channels and means establishing transfer paths out of the first cells to the corresponding first channels.

9. Buffering apparatus for transferring signal bits of digital information between a plurality of first bit-serial channels and at least one second bit-parallel channel, the apparatus comprising:

a matrix of pairs of bit storing cells connected in multiple rows and multiple columns, one row corresponding to each first channel;

first means establishing a parallel bit transfer path between the second channel and all cells in any one row, said first means comprising means for addressing any row and means for simultaneously transferring bits between the cells in the addressed row and the second channel; and second means establishing a path adapted for transferring bits of information serially between all cells in a row and the first channel corresponding to the row.

10. Buffering apparatus for transferring signal bits of digital information between a plurality of first bit-serial channels and at least one second bit-parallel channel, the apparatus comprising:

a matrix of pairs of bit storing cells connected in multiple rows and multiple columns, one row corresponding to each first channel;

first means establishing a parallel bit transfer path between the second channel and all cells in any one row; and second means establishing a path adapted for transferring bits of information serially between all cells in a row and the corresponding first channel, said second means comprising means for simultaneously addressing a different cell in each row, and means for transferring bits between the addressed cells and the first channel corresponding to the row from which a bit is transferred.

11. Buffering apparatus for bidirectionally transferring bit signals representing digital information between a unit transferring signals parallel by bit and any one of a plurality of units transferring signals serial by bit, the combination comprising:

a memory comprising a matrix of bit storing cells connected in multiple rows and multiple columns;

at least one conductor for each of said columns;

bidirectional parallel gating means for coupling bit signals from each of said at least one conductors into the cells in the corresponding column and vice versa, said parallel gating means coupling said signals between all cells in any one row and said at least one conductors;

at least one conductor for each of said rows; and bidirectional serial gating means for serially coupling bit signals from each row conductor into each cell in the corresponding row and vice versa.

12. The apparatus of claim 11 comprising parallel addressing means for addressing any one of the rows of cells, the parallel gating means being responsive to the addressing means for bidirectionally coupling bit signals into and out of the addressed row of cells.

13. The apparatus of claim 11 comprising serial addressing means for serially addressing a series of groups of cells, each group comprising a cell from each row, said serial gating means being responsive to the serial addressing means for bidirectionally coupling the bit signals into and out of the addressed group of cells.

14. The apparatus of claim 11 wherein each of said cells in each row comprises a pair of first and second bit storing cells, said parallel addressing means comprising means for addressing any one of the rows of pairs of cells, said serial addressing means comprising means for serially addressing groups of pairs of cells, each group comprising a different pair of cells from each row, each of the at least one column and row conductors comprising separate input and output conductors, said bidirectional parallel gating means comprising input parallel gating means for establishing a bit transfer path from each input column conductor into the first cell of the corresponding column in any row and output parallel gating means for establishing a bit transfer path out of each second cell in any row to the output column conductor corresponding to the cell, said serial gating means comprising input serial gating means for establishing a bit transfer path from any of the input row conductors into any one of the second cells of the corresponding row and output serial gating means for establishing a bit transfer path to each output row conductor out of any one of the first cells in the corresponding row.

15. Serial-parallel bidirectional buffering apparatus comprising:

a memory comprising a matrix of bit storing cells connected in multiple rows and multiple columns;

conductor means for each row and conductor means for each column of cells;

bidirectional parallel gating means for each row for establishing a parallel bit transfer path between the cells in the corresponding row and each column conductor means; and bidirectional serial gating means for each row conductor comprising means for establishing a bit transfer path between the corresponding row conductor means and all cells in the corresponding row.

16. Serial-parallel buffering apparatus comprising:

a matrix of bit storing cells connected in multiple rows and multiple columns, the cells being arranged into a plurality of groups, a different cell from each row in each group;

conductor means for each row and conductor means for each column of cells;

parallel addressing means for addressing each row;

serial addressing means for serially addressing each group of cells;

parallel gating means for each row responsive to the parallel addressing means for establishing a parallel bit transfer path between the addressed row of cells and each column conductor means; and serial gating means for each row conductor means responsive to the serial addressing means for establishing a bit transfer path between the cell in the addressed group of the corresponding row and the corresponding row conductor means.

17. Apparatus according to claim 16 wherein the cells in each group are from different columns.

18. Apparatus according to claim 16 wherein each of said cells comprises a pair of first and second cells and wherein said parallel gating means comprises input parallel gating means for each row for establishing a bit transfer path from each column conductor means into the first cells in the corresponding column of the addressed row and output parallel gating means for each row responsive to the parallel addressing means for establishing a bit transfer path out of the second cell of each column of the addressed row to the corresponding colun conductor means, and wherein said serial gating means comprises a serial input gating means responsive to the serial addressing means for establishing a bit transfer path from the row conductor means into the second cells of the corresponding row and output gating means responsive to the serial addressing means for establishing a bit transfer path out of the first cells to the row conductor means of the corresponding row.

19. Apparatus according to claim 16 wherein each of said bit storing cells comprises a pair of first and second cells, wherein said row conductor means comprises input and output conductors, wherein said parallel gating means comprises input parallel gating means for each row responsive to the parallel addressing means for establishing a bit transfer path from each column conductor means into the first cells in the corresponding column of the addressed row, and output parallel gating means for each row responsive to the parallel addressing means for establishing a bit transfer path out of the second cell of each column of the addressed row to the corresponding column conductor means; and wherein said serial gating means comprises a serial input gating means responsive to the serial addressing means for establishing a bit transfer path from the input row conductor means into the second cells of the corresponding row and output gating means responsive to the serial addressing means for establishing a bit transfer path out of the first cells to the output row conductor means of the corresponding row.

20. Digital data processing system, the combination comprising:

first means having a circuit for transferring a word of bit signals, parallel by bit;

a plurality of second means, each having a circuit for transferring a word of bit signals, serial by bit;

a matrix of bit storing cells connected in multiple rows and multiple columns, one row corresponding to each second means, said cells being in groups, a different cell from each row in each group;

first transfer means establishing a parallel bit transfer path between the circuit of said first means and all cells in any row; and second transfer means for each row for establishing further parallel paths between each row of cells and the second means corresponding to each such row, said second transfer means serially transferring bits of information between all cells in a row and the corresponding second means, the second transfer means comprising means for simultaneously transferring a bit from a cell in each group along said further parallel paths.

21. Apparatus according to claim 20 comprising means for enabling said group transfer means to transfer bits serially by group.

22. Apparatus according to claim 21 wherein said enabling means comprises a counting means for repeatedly counting through a sequence of counts, one count for each of said groups.

23. Digital data processing system, the combination comprising:

first means having a circuit for transferring a word of bit signals, parallel by bit;

a plurality of second means, each having a circuit for transferring a word of bit signals, serial by bit;

a matrix of pairs of bit storing cells connected in multiple rows and multiple columns, one row corresponding to each second means, each of said pairs of cells comprising first and second cells;

first transfer means establishing a parallel bit transfer path between the circuit of said first means and all cells in any row, said first transfer means establishing transfer paths into the first cells from the circuit of said first means and establishing transfer paths out of the second cells to the circuit of the first means; and second transfer means for each row for establishing parallel paths between each row of cells and the second means corresponding to each such row, said second transfer means establishing a path for serially transferring bits of information between all cells in a row and the circuit of the corresponding second means.

24. Digital data processing system, the combination comprising:

first means having a circuit for transferring a word of bit signals, parallel by bit;

a plurality of second means, each having a circuit for transferring a word of bit signals, serial by bit;

a matrix of pairs of bit storing cells connected in multiple rows and multiple columns, one row corresponding to each second means, each of said pairs of cells comprising first and second cells;

first transfer means establishing a parallel bit transfer path between the circuit of said first means and all cells in any row; and second transfer means for each row for establishing parallel paths between each row of cells and the second means corresponding to each such row, said second transfer means establishing a path for serially transferring bits of information between all cells in a row and the corresponding second means, said second transfer means establishing transfer paths into the second cells from the corresponding second means and establishing transfer paths out of the first cells to the corresponding second means.

25. Digital data processing system, the combination comprising:

first means having a circuit for transferring a word of bit signals, parallel by bit;

a plurality of second means, each having a circuit for transferring a word of bit signals, serial by bit;

a matrix of pairs of bit storing cells connected in multiple rows and multiple columns, one row corresponding to each second means, each of said pairs of cells comprising first and second cells;

first transfer means establishing a parallel bit transfer path between the circuit of said first means and all cells in any row, said first transfer means establishing transfer paths into the first cells from the circuit of the first means and establishing transfer paths out of the second cells to the circuit of the first means; and second transfer means for each row for establishing parallel paths between each row of cells and the second means corresponding to each such row, said second transfer means establishing a path for serially transferring bits of information between all cells in a row and the corresponding second means, said second transfer means establishing transfer paths into the second cells from the corresponding second means and establishing transfer paths out of the first cells to the corresponding second means.

26. Digital data processing system, the combination comprising:

first means having a circuit for transferring a word of bit signals, parallel by bit;

a plurality of second means, each having a circuit for transferring a word of bit signals, serial by bit;

a matrix of pairs of bit storing cells connected in multiple rows and multiple columns, one row corresponding to each second means;

first transfer means establishing a parallel bit transfer path between the circuit of said first means and all cells in any row, said first transfer means comprising means for addressing any row and means for simultaneously transferring bits between the cells in the addressed row and the circuit of the first means; and second transfer means for each row for establishing parallel paths between each row of cells and the second means corresponding to each such row, said second transfer means establishing a path for serially transferring bits of information between all cells in a row and the corresponding second means.

27. Digital data processing system, the combination comprising:

first means having a circuit for transferring a word of bit signals, parallel by bit;

a plurality of second means, each having a circuit for transferring a word of bit signals, serial by bit;
a matrix of pairs of bit storing cells connected in multiple rows and multiple columns, one row corresponding to each second means;
first transfer means establishing a parallel bit transfer path between the circuit of said first means and all cells in any row; and
second transfer means for each row for establishing parallel paths between each row of cells and the second means corresponding to each such row, said second transfer means establishing a path for serially transferring bits of information between all cells in a row and the corresponding second means, said second transfer means comprising means for simultaneously addressing a cell in each row and means for transferring bits between the addressed cells and the circuit of the second means corresponding to the row from which a bit is transferred.

28. Serial-parallel memory buffer system comprising:
a. a plurality of bistable state memory cells grouped into rows and columns;
b. a first gating circuit for each cell coupled to the corresponding cell;
c. a second gating circuit for each cell coupled to the corresponding cell;
d. a parallel input or output circuit comprising a first circuit for each of such columns for carrying, one by one, binary digital signals, each first circuit being coupled to each of the first gating circuits which are coupled to the cells in the corresponding column;
e. first means for each row, the first means being coupled in common to an input of each first gating circuit which is coupled to the cells in the corresponding row, each first means being adapted for simultaneously providing a control signal to all first gating circuits in the corresponding row and the first gating circuit being responsive thereto for coupling a binary signal between the first circuit for the corresponding column and the corresponding cell;
f. a serial input or output comprising a second circuit for each of such rows for carrying, one by one, binary digital signals, each of the second circuits being coupled to each of the second gating circuits which are coupled to the cells in the corresponding row; and
g. second means for each row, each second means being connected in common to an input of a second gating circuit for a different cell in each row, each second means being adapted for providing a control signal in common to all connected second gating circuits and the second gating circuits being responsive thereto for coupling a binary signal between the second circuit for the corresponding row and the corresponding cell.

29. The serial-parallel memory buffer system of claim 28 wherein said first means comprises an address storage means for storing a signal uniquely identifying any such row of cells whose first gating circuit is to receive a control signal.

30. The serial-parallel memory buffer system of claim 24 wherein said second means comprises an address storage means for storing a signal uniquely identifying any one group of second gating circuits having commonly connected inputs to receive a control signal.

31. The serial-parallel memory buffer system of claim 30 wherein said address storage means comprises a counter for sequentially addressing groups of second gating circuits sequentially one by one in a predetermined order.

32. The serial-parallel memory buffer system of claim 31 wherein said first means comprises an address storage means for storing a signal uniquely identifying any such row of cells whose first gating circuit is to receive a control signal.

33. The serial-parallel memory buffer system of claim 28 wherein the first gating circuit is characterized for gating a binary signal into a cell from a first circuit and the second gating circuit is characterized for gating a binary signal out of a cell to a second circuit.

34. The serial-parallel memory buffer system of claim 31 comprising:
a. a further bistable state memory cell associated with each first mentioned cell;
b. a third gating circuit for each further cell having an input coupled to an output of the corresponding further cell;
c. a fourth gating circuit for each further cell having an output coupled to an input of the corresponding further cell;
d. a parallel output circuit comprising a third circuit for each of such columns for carrying, one by one, binary digital signals, each third circuit being coupled to an output of each of the third gating circuits which are coupled to the further cells in the corresponding column;
e. third means for each row, the third means being coupled in common to an input of each third gating circuit which is coupled to an input of the further cells in the corresponding row, each third means being adapted for providing a control signal to all third gating circuits in the corresponding row and the third gating circuits being responsive thereto for coupling a binary signal to the third circuits from the corresponding cells;
f. a serial input comprising a fourth circuit for each of such rows for carrying, one by one, binary digital signals, each of the fourth circuits being coupled to an input of each of the fourth gating circuits which are coupled to the cells in the corresponding row; and
g. fourth means for each row, each fourth means being connected in common to an input of a fourth gating circuit for a different cell in each row, each fourth means being adapted for providing a control signal in common to all connected fourth gating circuits and the second gating circuits being responsive thereto for coupling a binary signal from the second circuit for the corresponding row to the corresponding cell.

* * * * *

PO-1050
(5/69)

UNITED STATES PATENT OFFICE
CERTIFICATE OF CORRECTION

Patent No. 3,763,472 Dated Oct. 2, 1973

Inventor(s) Richard S. Sharp

It is certified that error appears in the above-identified patent and that said Letters Patent are hereby corrected as shown below:

Col. 3, line 28, "b-16" should read --b5-16--;
Col. 6, line 1, "switcihing" should read --switching--;
line 10, "compltely" should read --completely--;
Col. 7, line 13, after "magnetic" insert --storage medium--;
Col. 8, line 9, "oe" should read --one--;
Col. 20, line 2, "24" should read --28--;
Col. 16, line 41, "colun" should read --column--.

Signed and sealed this 21st day of May 1974.

(SEAL)
Attest:

EDWARD M.FLETCHER,JR.
Attesting Officer

C. MARSHALL DANN
Commissioner of Patents